United States Patent [19]

Sheinkop et al.

[11] Patent Number: 4,812,151
[45] Date of Patent: Mar. 14, 1989

[54] VISCOSITY CONTROL IN THE MANUFACTURE OF MINERAL FIBERS

[75] Inventors: Isac Sheinkop, Columbus; Eugene C. Varrasso, Heath, both of Ohio

[73] Assignee: Owens-Corning Fiberglas Corporation, Toledo, Ohio

[21] Appl. No.: 179,358

[22] Filed: Apr. 8, 1988

[51] Int. Cl.⁴ .............................................. C03B 5/24
[52] U.S. Cl. .......................................... 65/29; 65/5; 65/14; 65/160; 65/162
[58] Field of Search .................. 65/29, 5, 14, 160, 162

[56] References Cited

U.S. PATENT DOCUMENTS

| | | |
|---|---|---|
| Re. 19,025 | 12/1933 | Soubier ............................ 65/162 X |
| 1,750,967 | 3/1938 | Rule .................................. 65/162 X |
| 2,679,749 | 6/1954 | Poole ................................. 65/29 X |
| 3,573,017 | 3/1971 | Griem . |
| 3,600,149 | 8/1971 | Chen et al. . |
| 3,838,999 | 10/1974 | Groves . |
| 4,028,083 | 6/1977 | Patznick et al. . |
| 4,090,241 | 5/1978 | Houston . |
| 4,203,155 | 5/1980 | Garst . |
| 4,277,274 | 7/1981 | Chrisman . |
| 4,297,893 | 11/1981 | Weinstein . |
| 4,392,879 | 7/1983 | Takeuchi et al. . |
| 4,405,351 | 9/1983 | Sheinkop . |

FOREIGN PATENT DOCUMENTS

WO82/02094 6/1982 PCT Int'l Appl. .
2091418 7/1982 United Kingdom .

Primary Examiner—Arthur Kellogg
Attorney, Agent, or Firm—Patrick P. Pacella; Ted C. Gillespie

[57] ABSTRACT

A method for manufacturing mineral fibers comprises forming mineral fibers from molten mineral material, continuously discharging an auxiliary stream of molten mineral material, continuously measuring the temperature and the mass flow rate of the auxiliary stream, calculating the viscosity of the material using the measured mass flow rate and modifying a process parameter in response to the measured temperature and calculated viscosity of the auxiliary stream.

7 Claims, 3 Drawing Sheets

VISCOSITY CONTROL IN THE MANUFACTURE OF MINERAL FIBERS

TECHNICAL FIELD

This invention pertains to manufacturing mineral fibers from molten mineral material. More particularly, this invention pertains to controlling the flow of molten glass supplied to fiber forming equipment, and controlling process parameters of a mineral fiber manufacturing process.

BACKGROUND OF THE INVENTION

It is a common practice to manufacture mineral fibers, such as glass fibers, by supplying molten mineral material from a furnace or melter to fiber forming apparatus. The fiber forming apparatus commonly comprises spinners for centrifuging the molten mineral material into mineral fibers. Other fiber forming equipment used includes bushings or feeders for making continuous fibers of mineral material. When spinners are used for fiber forming, the production is sometimes facilitated by the use of burners which keep the spinner at proper operating temperatures. Also, annular blowers can be positioned adjacent the spinner to assist in attenuation of the fibers to the desired diameter.

One of the problems which has long plagued the manufacturers of mineral fibers is variation in the viscosity of the glass flowing into the fiber forming apparatus. In a continuous fiber manufacturing process, variations in the viscosity of the glass can affect both the yardage of the fiber glass, i.e., glass fiber diameter, and the strength of the glass fibers. In manufacturing wool type fibers using a rotary fiberizer, variations in glass viscosity can affect the throughput, the fiber diameters, and the length of the fibers.

Existing methods of glass viscosity measurement are not sufficient for adequate control. Typically, a glass sample is taken from the furnace or forehearth and the sample is removed to a testing station where the viscosity is determined using calibrated instruments. The process takes a considerable amount of time, and is done off line. The results of the viscosity analysis are often learned too late to make any correction in the fiber forming process.

Chrisman in U.S. Pat. No. 4,277,274, discloses a method of controlling a glass melting furnace in which the viscosity is determined, and in which molten glass is added to the forehearth in response to deviations from glass viscosity setpoints. The viscosity in Chrisman is determined using sensed electrical conductivity of the glass flowing through the forehearth. Chrisman also suggests that the viscosity can be determined using a strain gauge on the shaft of the mixer which can be positioned within the forehearth. These solutions proposed by Chrisman involve some uncertainty because of the fact that the glass on which the viscosity is being measured is still within the forehearth. It has been found that measuring viscosity with equipment installed in the mainstream flow of molten glass, such as in the forehearth, is difficult due to the hostile environment within the molten glass for the equipment. The lack of access to the equipment gives the inevitable result that the equipment fails and the measuring process is out of control.

There is still a need for a method and apparatus which enables the glass viscosity to be measured on line, and in a continuous mode. It is also important that the viscosity measurement method be accomplished without disturbing the mineral fiber manufacturing process. Further, the equipment should be outside of the molten glass in order to give access and longevity to the equipment.

STATEMENT OF THE INVENTION

A method for controlling a mineral fiber manufacturing process has now been developed in which an auxiliary stream of molten mineral material, distinct from the streams of material going to the fiber forming equipment, is discharged from the molten mineral material delivery means, the temperature and the mass flow rate of the auxiliary stream is used to determine the viscosity of the molten material, and the temperature and the viscosity are used to control the manufacturing process.

According to this invention, there is provided a method for manufacturing mineral fibers comprising feeding molten mineral material from a delivery means through a primary discharge bushing to a means for forming mineral fibers, forming mineral fibers from the molten mineral material, continuously discharging an auxiliary stream of molten mineral material from the delivery means through an auxiliary discharge outlet, continuously measuring the temperature and the mass flow rate of the auxiliary stream, calculating the viscosity of the molten mineral material using the measured mass flow rate, and modifying a process parameter in response to the measured temperature of the auxiliary stream and the calculated viscosity of the stream.

The invention is advantageous in that it measures glass viscosity directly on line, and all the instrumentation equipment is outside the glass stream. The method of this invention also takes into account the viscosity/temperature dependence and the viscosity/composition dependence. The method of the invention provides an early warning of composition changes and enables automatic changes of various process parameters to compensate for, and/or correct viscosity deviations.

In a specific embodiment of the invention, the step of modifying the process parameter comprises changing the composition of the batch material being supplied to the furnace.

In another specific example of the invention, the step of modifying a process parameter comprises changing the temperature of the molten material being discharged through the primary discharge bushing.

In yet another embodiment of the invention, the step of modifying a process parameter comprises changing the temperature of a bushing for making continuous glass fibers.

In still another specific embodiment of the invention, the step of modifying a process parameter comprises changing the temperature of a forehearth positioned between the primary discharge bushings and the furnace.

In another embodiment of the invention, the step of modifying a process parameter comprises changing the temperature of the fiber forming environment adjacent to the spinner peripheral wall in a rotary fiber forming process.

In a preferred embodiment of the invention, the mass flow rate of the auxiliary stream is measured by sensing the weight of a gob of glass on a teeter-totter at two distinct points in time, and measuring the interval between the two distinct points of time.

DESCRIPTION OF THE INVENTION

This invention will be described in terms of a glass fiber forming and attenuating process. It is to be understood, however, that the process is suitable for fibers of other mineral materials, particularly of such materials as rock, slag and basalt.

Figure 1:
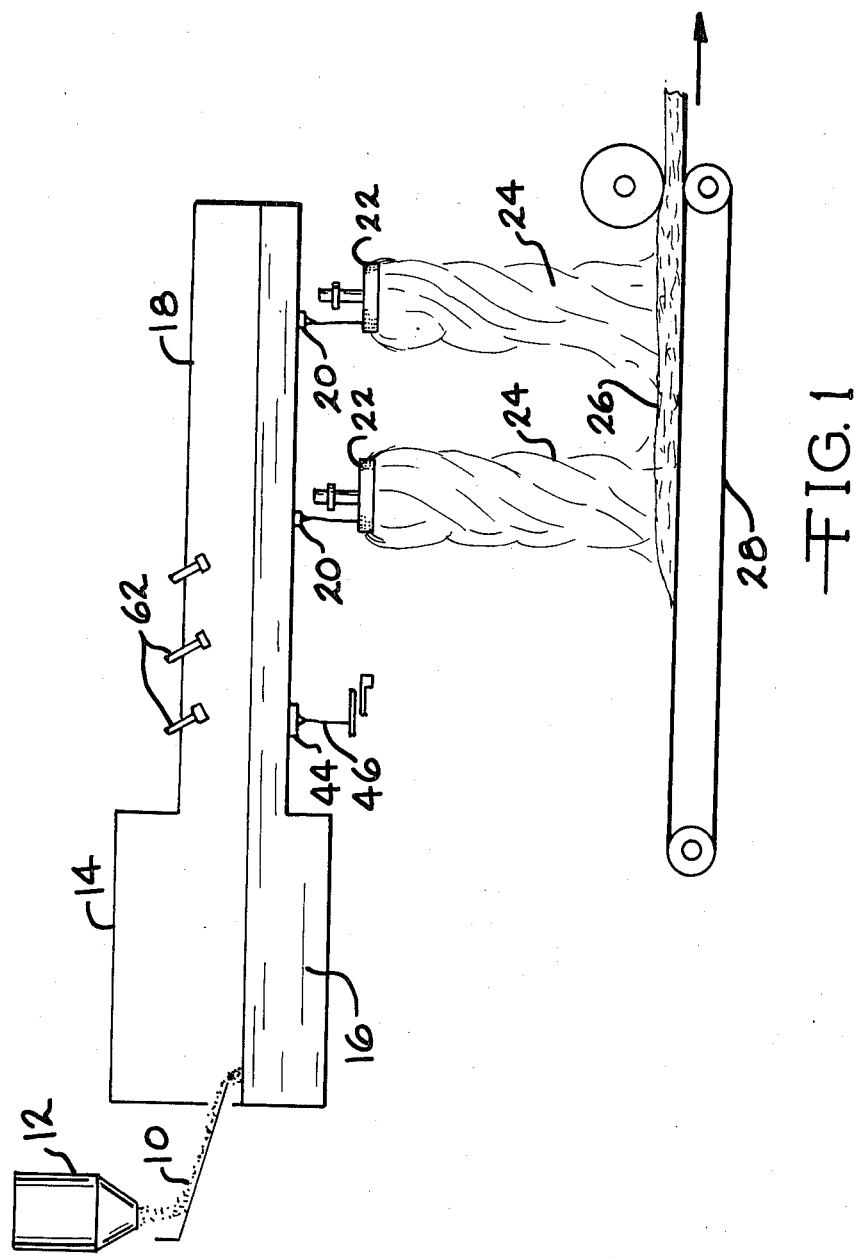
FIG. 1 is a schematic view in elevation of apparatus for manufacturing mineral fibers according to the process of the invention.

As shown in FIG. 1, glass batch 10 is supplied from batch supply 12 into furnace or melter 14. After the glass has melted, the molten glass 16 flows through a molten glass delivery means, such as forehearth 18. The molten glass is delivered from the forehearth through any suitable primary discharge means, such as primary discharge bushings 20 into appropriate mineral fiber forming equipment, such as rotary fiberizers 22. The rotary fiberizers produce downwardly moving veils 24 of glass fibers which are collected as pack 26 on any suitable means, such as conveyor 28.

Figure 2:
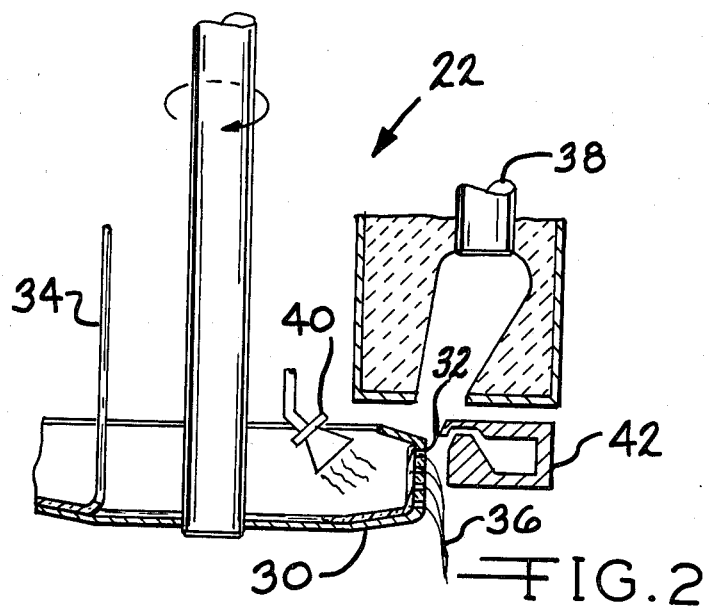
FIG. 2 is a schematic sectional view in elevation of a rotary fiberizer similar to those shown in FIG. 1, for manufacturing mineral fibers.

As shown more clearly in FIG. 2, the fiberizer is comprised of spinner 30 mounted for rotation, and having spinner peripheral wall 32 containing orifices for discharging tiny molten streams of glass. The molten glass stream 34 is dropped from the forehearth and primary discharge bushings into the rotating spinner. The molten glass is forced to flow through the orifices in the spinner peripheral wall by centrifugal force to form glass fibers 36. The spinner and fibers can be maintained at proper operating temperatures, if so desired, by annular burner 38, an internal burner such as internal burner 40, or any other suitable means. Any suitable means for facilitating further attenuation, such as blower 42, can also be used. All of the apparatus shown in FIG. 2 is well known in the art.

An auxiliary discharge outlet, such as drain bushing 44, is positioned in the forehearth to continuously discharge auxiliary stream 46 of molten glass. This is shown in FIG. 1, and in more detail, in FIG. 3. Any appropriate means for continuously discharging a representative sample of molten glass from the forehearth, or from the furnace itself, will be suitable for purposes of the invention.

Figure 3:
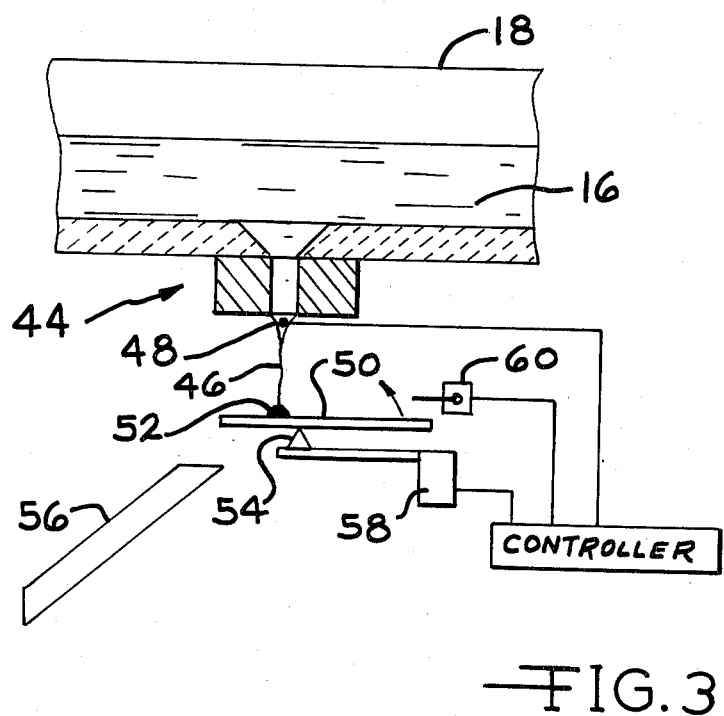
FIG. 3 is a schematic view in elevation of a drain bushing for continuously discharging an auxiliary stream of molten glass.

It is necessary to measure the temperature of the glass emanating from the drain bushing. Any suitable means can be used, such as thermocouple 48 positioned at the outlet of the drain bushing. The thermocouple can be connected to a controller by any suitable method, as shown in FIG. 3. The controller can be any suitable electronic processing device, such as a computer.

It is necessary to measure the throughput of the stream of glass. This can be accomplished by any suitable technique, several of which are well known in the art.

As shown in FIG. 3, the apparatus for one method of measuring the mass flow rate, or throughput, comprises teeter-totter 50 for accumulating a glass in a gob of glass 52. The teeter-totter is mounted on fulcrum 54 for rotation in the direction of the arrow. Once the accumulated weight of the gob of glass is sufficient to tip the teeter-totter, the gob of glass will drop into the water cooled gob chute 56, as is well known in the art. The teeter-totter and fulcrum are mounted to rest on a means for sensing the total weight of the fulcrum, teeter-totter and gob of glass. Any suitable means can be used, such as load cell 58. The load cell can be connected to the controller by appropriate means, as shown. A sensor, such as limit switch 60, can be positioned to signal the controller when a gob of glass has dropped into the chute, and a new gob of glass has begun accumulating.

In operation, the controller, which includes a clock, measures the weight of the fulcrum, teeter-totter and gob of glass at various times, and calculates the mass flow rate by determining the amount of weight increase over the amount of time. The limit switch enables the controller to begin the weighing cycle shortly after a gob has dropped and to end the weighing cycle shortly before the gob is dropped, thereby eliminating the possibility of trying to weigh the gob of glass while the gob is being dropped into the gob chute.

The controller can be programmed to calculate the mass flow rate of the auxiliary stream in a rather continuous mode. The controller can also be programmed to calculate the viscosity of the molten glass using the measured mass flow rate. Finally, the controller can be programmed to take the temperature of the auxiliary stream and the calculated viscosity of the stream and direct a change in a process parameter. An example of viscosity calculation is as follows:

$$\text{Log viscosity} = C - \text{Log } Q;$$

where $$C = \frac{AHD^2 d^4}{L}$$

and

A is a constant;
H is the head of glass above the drain bushing;
D is density of glass;
d is the diameter of the tip of the drain bushing; and
L is the length of the tip of the drain bushing;
and where Q is the throughput of glass through the drain bushing.

Another method of stating the formula is:

$$\text{viscosity} = \frac{AHD^2 d^4}{QL}$$

where viscosity is given in poise and Q is given in lb./hr.

Experimentally, it has been determined that the value 7269 for constant A is appropriate where the density is measured in grams per cubic centimeter, the diameter is measured in inches, and the head, tip diameter and tip length are measured in inches.

The change in the process parameter in response to the measured temperature and the calculated viscosity of the auxiliary stream can be any one or more of several process parameters. For example, the chemical composition of the batch material being supplied to the furnace can be changed. Changing the batch composition would be a slow method of responding to changes in the viscosity, possibly requiring two or three days for a complete response. Another process parameter that can be changed is that of changing the temperature of the molten material being discharged through the primary discharge bushings. This can be done in any way, such as by providing electrical resistance heating to the primary discharge bushings.

Another means of responding to the calculated viscosity and sensed temperature, is to change the temperature of the forehearth, such as by adding heat to the forehearth through such means as auxiliary forehearth burners 62. Another process parameter which can be controlled in response to the calculated viscosity and sensed temperature, is the temperature of the fiber forming environment adjacent the spinner peripheral wall in a rotary fiber forming process. This can be accomplished by modifying the burner gas pressure of either the internal burner or the external burner. This can also be accomplished by changing the pressure in the attenuation blower.

Obviously, modifying process parameters closest to the fiber forming process results in the quickest or most responsive change in the fiber manufacturing process to compensate for changes in viscosity.

Figure 4:
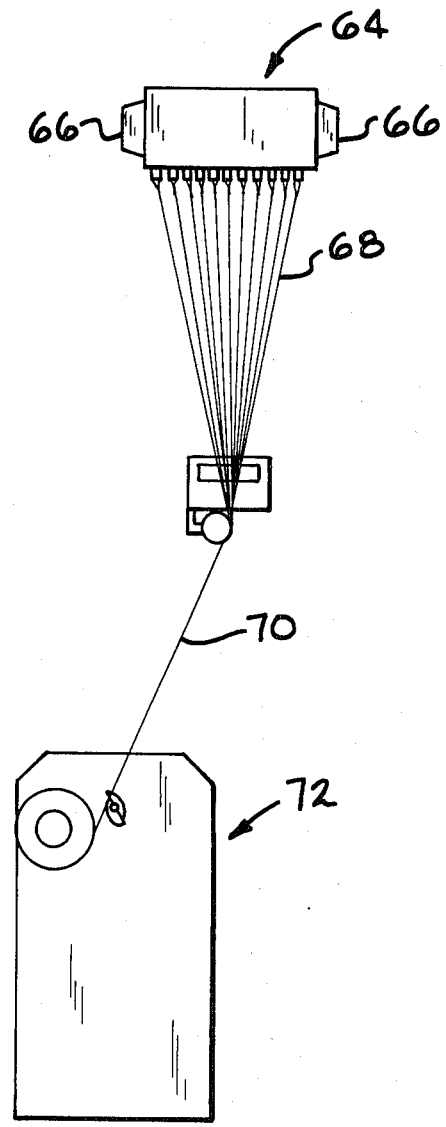
FIG. 4 is a schematic view in elevation of means for manufacturing continuous glass fibers.

The invention can also be employed in a process for the manufacture of continuous glass fibers. Apparatus for making continuous glass fibers is shown in FIG. 4. Bushing or feeder 64 is maintained at the appropriate temperature through electric heating by passing current through terminals 66, in the manner well known in the art. The orificed bushing bottom wall produces glass filaments 68 which are gathered into strand 70 and wound up into a package by any suitable means, such as winder 72. In one embodiment of the invention the process parameter that is modified in response to the measured temperature and the calculated viscosity of the auxiliary stream, is the temperature of the bushing for making continuous glass fibers.

It will be evident from the foregoing that various modifications can be made to this invention. Such, however, are considered as being within the scope of the invention.

INDUSTRIAL APPLICABILITY

This invention will be found to be useful in the production of glass fibers for thermal and acoustical insulation, and for reinforcements.

We claim:

1. A method for manufacturing mineral fibers comprising feeding molten mineral material from a delivery means through a primary discharge bushing to a means for forming mineral fibers, forming mineral fibers from the molten mineral material, continuously discharging an auxiliary stream of molten mineral material from the delivery means through an auxiliary discharge outlet, continuously measuring the temperature and the mass flow rate of the auxiliary stream, calculating the viscosity of the molten mineral material using the measured temperature and the measured mass flow rate, and modifying a process parameter in response to the measured temperature of the auxiliary stream and the calculated viscosity of the stream.

2. The method of claim 1 in which the step of modifying a process parameter comprises changing the composition of the batch material being supplied to the furnace.

3. The method of claim 1 in which the step of modifying a process parameter comprises changing the temperature of the glass being discharged through the primary discharge bushing.

4. The method of claim 3 in which the step of modifying a process parameter comprises changing the temperature of a bushing for making continuous glass fibers.

5. The method of claim 3 in which the step of modifying a process parameter comprises changing the temperature of a forehearth positioned between the primary discharge bushing and the furnace.

6. The method of claim 3 in which the step of modifying a process parameter comprises changing the temperature of the fiber forming environment adjacent the spinner peripheral wall in a rotary fiber forming process.

7. The method of claim 1 in which the mass flow rate of the auxiliary stream is measured by collecting the auxiliary stream as a gob of molten mineral material, and weighing the gob.

* * * * *